A. R. Field,
Harness Motion for Loom.
No. 106,571. Patented Aug. 23, 1870.
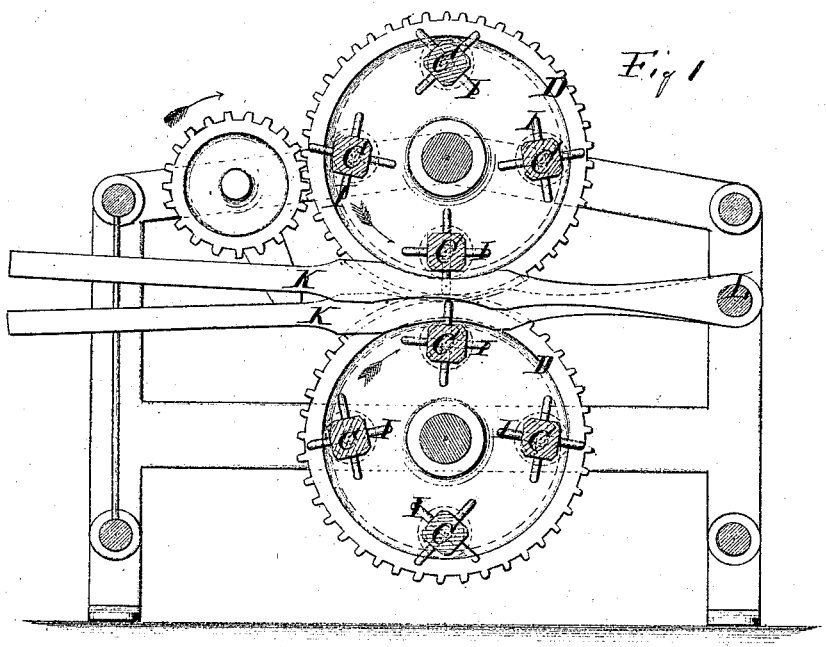
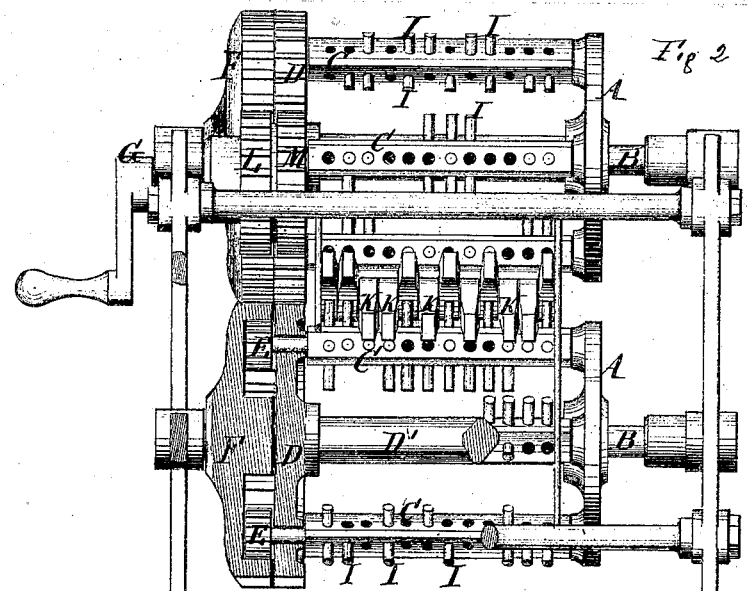

United States Patent Office.

ALBERT R. FIELD, OF CENTRAL FALLS, RHODE ISLAND.

Letters Patent No. 106,571, dated August 23, 1870.

IMPROVEMENT IN HARNESS-OPERATING MECHANISM FOR LOOMS.

The Schedule referred to in these Letters Patent and making part of the same

*To all whom it may concern:*

Be it known that I, ALBERT R. FIELD, of Central Falls, in the county of Providence and State of Rhode Island, have invented new and useful Improvements in Harness Motion for Looms; and I do hereby declare that the following is a full, clear, and exact description thereof, which will enable others skilled in the art to make and use the same, reference being had to the accompanying drawing forming part of this specification.

This invention relates to improvements in harness motion for looms, and consists in a novel arrangement of differential gears for turning one or two sets of tappet-shafts on their own axis, while being carried around the shafts of drums on which they are mounted, said drums being arranged in connection with a set of levers, so that the tappets of the said tappet-shafts will act upon them, all as hereinafter described.

Figure 1 is a transverse sectional elevation of my improved apparatus.

Figure 2 is a front elevation of the same with a part sectional.

Similar letters of reference indicate corresponding parts.

A represents disks or drum-heads, or it may be arms, mounted on shafts B, arranged in suitable supports, preferably one above the other.

These disks furnish bearings for four or more tappet-shafts, C, at one end, which are similarly journaled at the other ends in toothed disks or wheels D, also mounted on the shafts B and connected with the disks by sleeves D', or other means, so that they turn with the said disks D. These ends of the said tappet-shafts project through the disks D, and have pinions, E, on them, which gear with the internally toothed disks or wheels F, which are also toothed externally, having the same number of teeth as the disks D, say eighty; the internal gears have also eighty teeth, and the pinions sixteen.

G represents a driving-shaft, having one pinion, L, of twenty-one teeth gearing with the upper wheel F, and another, M, of twenty teeth gearing with the upper wheel D.

The two wheels F F and D D are geared together.

The tappet-shafts are provided with tappets I, projecting from each of their four sides, and arranged in any order for action upon the levers K, pivoted at L, and arranged between the drums, as shown.

It will be seen that in one revolution of the disk D, the disks F, having the internal gears, being driven by the wheel having one tooth more than the one driving disk D, and the pinion driving the latter making four revolutions to the one of the said disk D, the disk F will gain four teeth over D, which will cause the tappet-shafts having pinions of sixteen teeth to turn one quarter of a revolution on their own axis; consequently, there being four of the said tappet-shafts, each making four different changes, there will be sixteen changes before repeating, and any number of harnesses may be used.

Care is taken to gear the pinions of the tappet-shafts with the disks F, so that the tappets will be in the right position to act on the levers when they come around to them.

If a wheel of nineteen teeth be put in place of wheel L the result will be the same, except that the wheels F would fall behind the same number of teeth, and the tappet-shafts would be turned the other way.

With five tappet-shafts and one pinion of sixteen and another of seventeen teeth on the driving-shaft, twenty changes could be made.

With six tappet-shafts and the large gears, all having ninety-six teeth, and pinions of sixteen and seventeen teeth on the driving-shaft, twenty-four changes could be made.

Of course other variations of like character could be made, and almost any required number of changes obtained, well calculated for fancy weaving, such as figured muslins, and the like.

This arrangement is well adapted for running the loom at high speed, the motions being much more smooth and easy than the ordinary arrangements of hooking and unhooking apparatus.

The machine may be placed at the end of the loom, with the pinions L M on the crank-shaft of the loom, and the levers connected with two sets of levers on the loom, one above and the other below, by straps or cords, or it may be arranged in any other approved way.

I propose, in some cases, to use only one set of disks, A D F, for carrying and operating the tappet-shafts, the said tappets being used to move the levers one way, and springs or weights being used to work them the other way.

Having thus described my invention,

I claim as new and desire to secure by Letters Patent—

The levers K, in combination with one or two sets of tappet-shafts C, and pinions L M, and disks A D, and internally toothed disk F, all arranged and operating substantially as described.

ALBERT R. FIELD.

Witnesses:
HENRY E. WHIPPLE,
WILLIAM KEENAN.